United States Patent
Kamay et al.

(10) Patent No.: US 7,913,046 B2
(45) Date of Patent: Mar. 22, 2011

(54) METHOD FOR PERFORMING A SNAPSHOT IN A DISTRIBUTED SHARED FILE SYSTEM

(75) Inventors: Yaniv Kamay, Modiyin (IL); Miki Rosin, Brookline, MA (US); Dror Granot, Holon (IL)

(73) Assignee: Dell Global B.V. - Singapore Branch, Singapore (SG)

( * ) Notice: Subject to any disclaimer, the term of this patent is extended or adjusted under 35 U.S.C. 154(b) by 519 days.

(21) Appl. No.: 11/834,337

(22) Filed: Aug. 6, 2007

(65) Prior Publication Data

US 2009/0043977 A1    Feb. 12, 2009

(51) Int. Cl.
    *G06F 13/00* (2006.01)
(52) U.S. Cl. ........................................ 711/162; 711/156
(58) Field of Classification Search .................. 711/156, 711/162
See application file for complete search history.

(56) References Cited

U.S. PATENT DOCUMENTS

| | | | |
|---|---|---|---|
| 5,403,639 A | 4/1995 | Belsan et al. | |
| 5,649,152 A | 7/1997 | Ohran et al. | |
| 5,790,773 A | 8/1998 | DeKoning et al. | |
| 6,108,749 A | 8/2000 | White et al. | |
| 6,182,198 B1 * | 1/2001 | Hubis et al. | 711/162 |
| 6,341,341 B1 | 1/2002 | Grummon et al. | |
| 6,374,268 B1 | 4/2002 | Testardi | |
| 6,434,681 B1 | 8/2002 | Armangau | |
| 6,460,054 B1 | 10/2002 | Grummon | |
| 6,725,392 B1 * | 4/2004 | Frey et al. | 714/6 |
| 7,043,485 B2 | 5/2006 | Manley et al. | |
| 7,072,916 B1 | 7/2006 | Lewis et al. | |
| 7,433,898 B1 * | 10/2008 | Georgiev | 707/202 |
| 2007/0226320 A1 * | 9/2007 | Hager et al. | 709/219 |
| 2007/0248029 A1 * | 10/2007 | Merkey et al. | 370/255 |

* cited by examiner

*Primary Examiner* — Reba I Elmore
(74) *Attorney, Agent, or Firm* — Baker Botts L.L.P.

(57) ABSTRACT

A method for performing a snapshot in a distributed shared file system (DSFS) is provided. The method includes synchronizing a snapshot operation among a plurality of domains of the DSFS; writing pending write requests to a memory to suspend write operations for the domains of the DSFS; and after the writing the pending write requests, generating a snapshot file comprising data items representing a current state of the DSFS.

40 Claims, 5 Drawing Sheets

METHOD FOR PERFORMING A SNAPSHOT IN A DISTRIBUTED SHARED FILE SYSTEM

BACKGROUND OF THE INVENTION

1. Field of the Invention

Illustrative, non-limiting embodiments of the present invention relate generally to distributed shared file systems (DSFS), and more particularly to a method for performing snapshots in distributed shared file systems.

2. Description of the Related Art

As the capacity of data storage systems continues to increase to meet user demands, the need to backup the data that the system stores likewise has been increasing. Also, during the backup process, the reliability of the storage system should be maintained by disrupting access to the storage system as little as possible and ensuring that data is not lost or corrupted during the backup process.

One technique for increasing the reliability of the storage system is a "snapshot" technique. A "snapshot" is a copy of a file, disk, or other storage unit at a certain point in time. In one implementation, a system administrator of the system initiates a request for performing the snapshot.

During one type of snapshot technique, the data stored in a storage unit is copied at regular time intervals to a single, dedicated storage device, or to a different storage device, to create a snapshot. Snapshots can be used for various data processing and storage management functions, including, but not limited to, transaction processing, multiple concurrent user access, software debugging, etc. After the snapshot is created, it may be stored as backup data in a different storage device, such as a tape drive or an optical disk.

After the snapshot of the data is created, the storage system may lose or incorrectly change a program or data due to a human error or a system malfunction. In such a case, the program, data or the entire content of the storage unit, as it existed at the time of the snapshot, can be restored from the snapshot.

In one example, a snapshot may be created by copying data from a production data set, which is stored at a particular storage location, to a snapshot copy data set. During the creation of the snapshot, the system cannot write new data to the storage location until the original data stored in the storage location has been copied to create the snapshot copy data set.

As such, while a snapshot is created, the system typically must stop or suspend all of the application programs that may change the related files or data contained in the particular storage location. Otherwise, the programs would change the stored data while it is being copied, and thus, the snapshot may contain erroneous data or programs or may not accurately reflect the data that was supposed to be stored at the time that the snapshot was created. However, suspending or stopping all of the application programs of the storage system is inefficient and is especially challenging in a distributed shared file system in which one or more files or application programs are shared among multiple clients.

FIG. 1 shows an exemplary diagram of a related art distributed shared file system 100 which comprises a plurality of independent network nodes 110, a plurality of storage devices 120, and a plurality of clients 140-1 to 140-N. The storage devices 120 are connected to the nodes 110 via a connection, including but not limited to a fiber channel (FC) switch 130. Furthermore, the storage device 120 comprise various devices, such as tape drives, magnetic disk drives, optical disk drives, a redundant array of independent disks (RAID), etc.

The network nodes 110 are also connected to the clients 140-1 to 140-N through a connection 150, such as a switch, a gigabit Ethernet, or an InfiBand connection. Also, the clients 140-1 to 140-N may use virtually any type of file sharing protocol, such as a network file system protocol (NFS), a common internet file system protocol (CIFS), a direct access file system protocol (DAFS), an AppleShare for file access, an iSCSI for block access, etc.

In the example shown in FIG. 1, the nodes 110 are linked together via a dedicated interconnect network 160. However, one skilled in the art will appreciate that the nodes 110 may be connected together via a wide area network (WAN), a metropolitan area network (MAN), a local area network (LAN), etc. By linking the nodes 110 together, the distributed shared file system 100 can combine dispersed data centers into a single, unified storage device. Moreover, in one example, each node 110 may be responsible for a domain, which is a subset or a range of designated data objects that can be identified by their unique key. Moreover, in one implementation, a file system domain (FSD), which the nodes 110 run, may maintain the domain. A non-limiting example of the distributed shared file system 100 is disclosed in U.S. Patent Application Publication No. 2004/0158663, entitled "Interconnect Topology for a Scalable Distributed Computer System," which is hereby incorporated by reference for all purposes.

In order to create a snapshot of the system 100, one of the clients 140-1 to 140-N may execute a snapshot command or request. In response, the node 110 blocks or suspends all tasks that the system 100 is currently executing when the snapshot is requested and blocks or suspends all tasks that are initiated after the request. These tasks are blocked or suspended until the process for creating the snapshot is complete. Accordingly, this process halts the operation of system 100 for a long period of time, thereby decreasing its efficiency. Moreover, some tasks include multiple sub-tasks, and as a result, suspending these types of tasks prevents the tasks from properly terminating and may cause data loss.

SUMMARY OF THE INVENTION

Exemplary, non-limiting embodiments of the present invention overcome various disadvantages. In addition, the present invention is not required to overcome these disadvantages, and an exemplary, non-limiting embodiment of the present invention may not overcome any problems.

According to an aspect of the present invention, there is provided a method for performing a snapshot in a distributed shared file system (DSFS), comprising synchronizing a snapshot operation among a plurality of domains of the DSFS; writing pending write requests to a memory to suspend write operations for the domains of the DSFS; and after the writing the pending write requests, generating a snapshot file comprising data items representing a current state of the DSFS.

According to another aspect of the present invention, there is provided a computer program product including a computer-readable medium comprising software instructions operable to enable a computer to execute a method for performing a snapshot in a distributed shared file system (DSFS), the method comprising synchronizing a snapshot operation among a plurality of domains of the DSFS; writing pending write requests to a memory to suspend write operations for the domains of the DSFS; and after the writing the pending write requests, generating a snapshot file comprising data items representing a current state of the DSFS.

BRIEF DESCRIPTION OF THE DRAWINGS

The above and other aspects of the present invention will be more clearly understood from the following detailed descrip

DESCRIPTION OF THE EXEMPLARY EMBODIMENTS

Exemplary, non-limiting embodiments of the present invention will now be described more fully with reference to the accompanying drawings.

Figure 1:
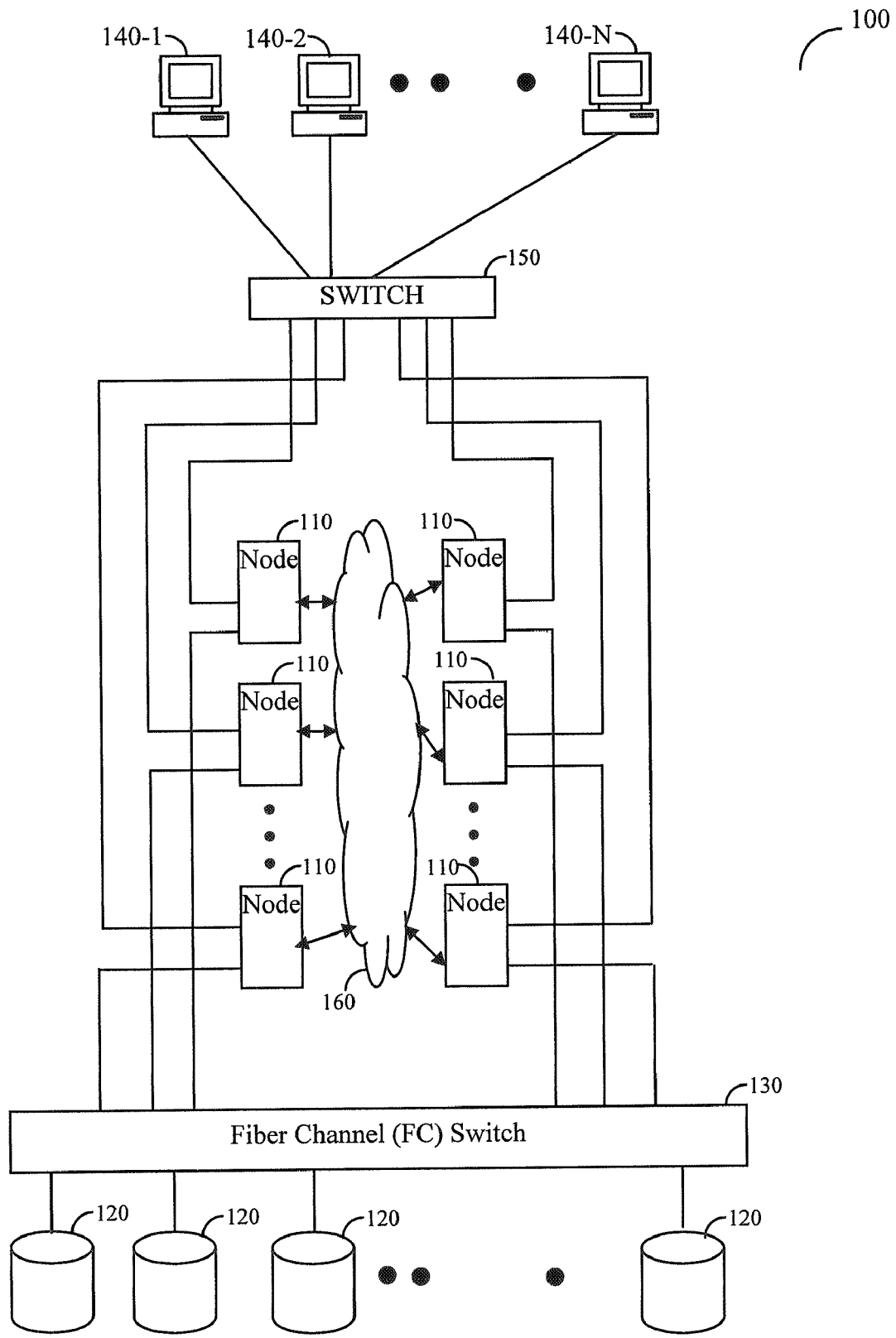
- FIG. 1 is a diagram of a related art distributed shared file system.
Figure 2:
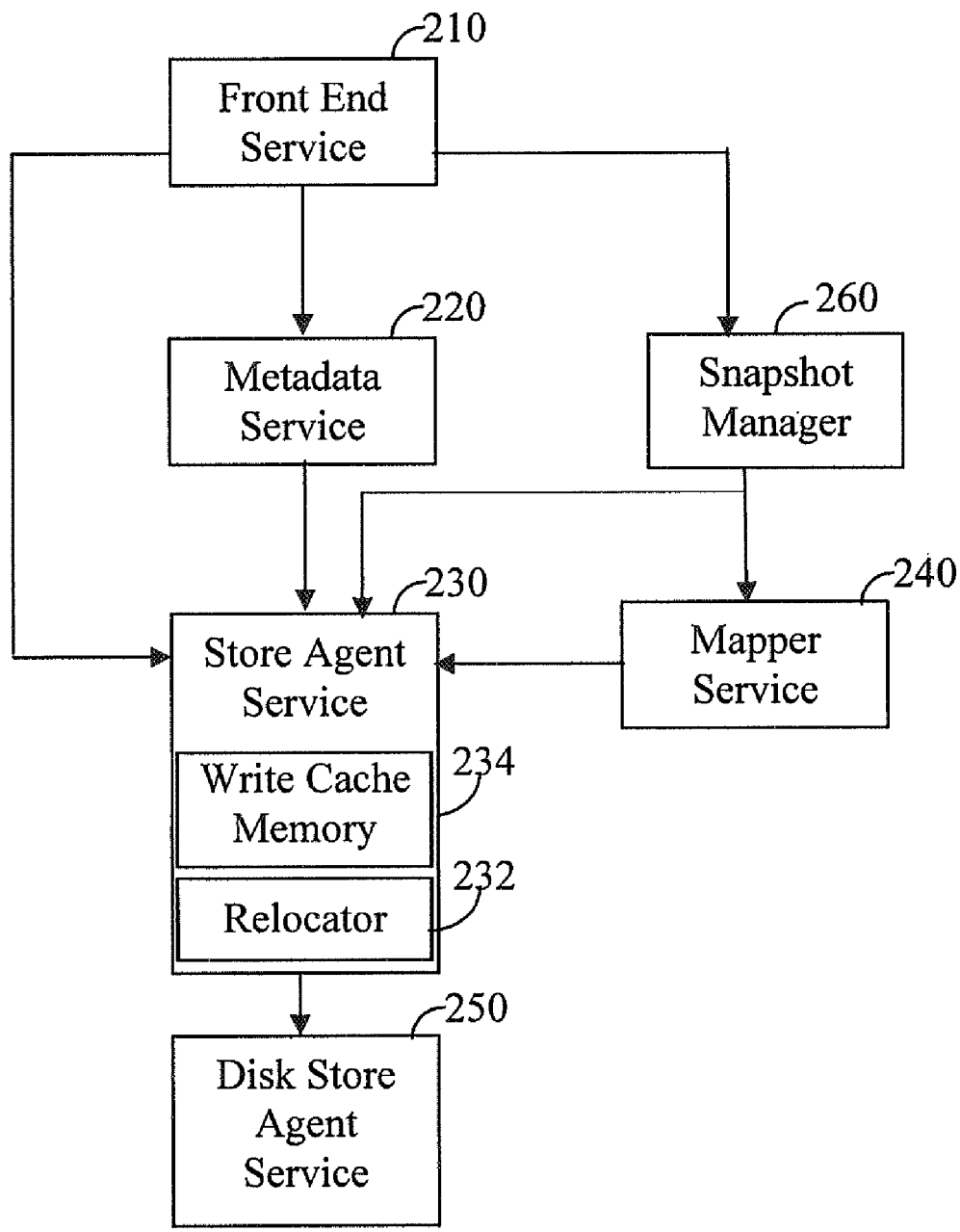
FIG. 2 is a block diagram of a distributed shared file system according to an exemplary embodiment of the present invention.

FIG. 2 shows a block diagram of a distributed shared file system (DSFS) 200 that performs a snapshot according to an exemplary embodiment. The DSFS 200 comprises a collection of different storage services that operate jointly. Furthermore, in one example, the nodes 110 in the storage system 100 execute the various storage services.

In the present exemplary embodiment, the services are location independent, may run either on the same node 110 or on different nodes 110; and comprise a front end service 210, a metadata service 220, a store agent service 230, a mapper service 240, and a disk store agent service 250. These services 210, 220, 230, 240, and 250 communicate with each other, and the nodes 110 communicate with each other using, for example, a proprietary remote procedure call (RPC) mechanism implemented over the network 160.

The front end service 210 receives requests from one of the clients 140-1 to 140-N and interfaces with other services 220, 230, 240, and 250 of the DSFS 200. For example, the front end service 210 may act as a protocol converter, which translates client-side protocols, such as NFS and CIFS protocols, to internal file system requests, such as RPC requests.

The metadata service 220 may interface with the front end service 210 and manage metadata information of objects or files. The metadata information is used to determine certain metadata information about the file relating to the RPC requests, and the metadata information may include information relating to the type of the file, permissions of the file, ownership of the file, and other data besides the content of the file.

The mapper service 240 is a location service that maps data items to their physical locations in the system 100. Moreover, the mapper service 240 is capable of supporting a variety of mapping schemes, and each mapping scheme may be uniquely used for each type of object.

The store agent service 230 provides data logging services and includes a relocator 232 and a memory 234. The relocator 232 handles data that is located in the memory 234, and in an exemplary embodiment, the memory 234 may comprise a write cache memory 234. The relocator 232 saves, removes and allocates space to data items in the memory 234. The write cache memory 234 may also include, but is not limited to, a volatile random access memory (RAM), which is connected to an uninterruptible power supply (UPS) in the event of a power failure. Furthermore, in one example, the store agent service 230 does not perform "in-place writes," which create a log of locations where write operations are to be performed and do not actually perform write operations at the locations.

The disk store agent service 250 handles data that is located in a specific storage device, such as a disk, or a group of disks, and writes and reads data to and from the physical storage device. In the DSFS 200, there may be one or more services 250, and each of the services 250 may correspond to a different, specific storage device.

An example of the DSFS 200 is disclosed in U.S. Patent Application Publication No. 2003/0159006, entitled "Flexible and Adaptive Read and Write Storage System Architecture," which is hereby incorporated by reference for all purposes.

In one exemplary embodiment, in order to take a snapshot in the DSFS 200 without losing any unsaved data or metadata, the DSFS 200 empties all store agent services 230 running on all of the nodes 110. One way to empty the services 230 is to complete all file system requests that the services handle prior to executing the snapshot. For instance, the DSFS 200 includes every write request, which it acknowledged before performing the snapshot, in the data copy created by the snapshot operation. To include every write request, the store agent services 230 write all pending write requests to the cache memory 234 and acknowledge the requests prior to performing the snapshot. Then, as discussed in greater detail below, the store agent services 230 and mapper service 240 execute tasks to support the snapshot operation.

The DSFS 200 also includes a snapshot manager service 260 that communicates with the front end service 210, the store agent service 230, and the mapper service 240. The snapshot manager 260 executes tasks related to creating and removing snapshot objects, generating snapshot statistics, and synchronizing the snapshot operation on all domains. Also, the manager 260 can selectively roll back or "rewind" a storage disk (e.g., volume) to a point in time when a certain snapshot was taken to retrieve a particular program, data or content of a storage unit.

Figure 3:
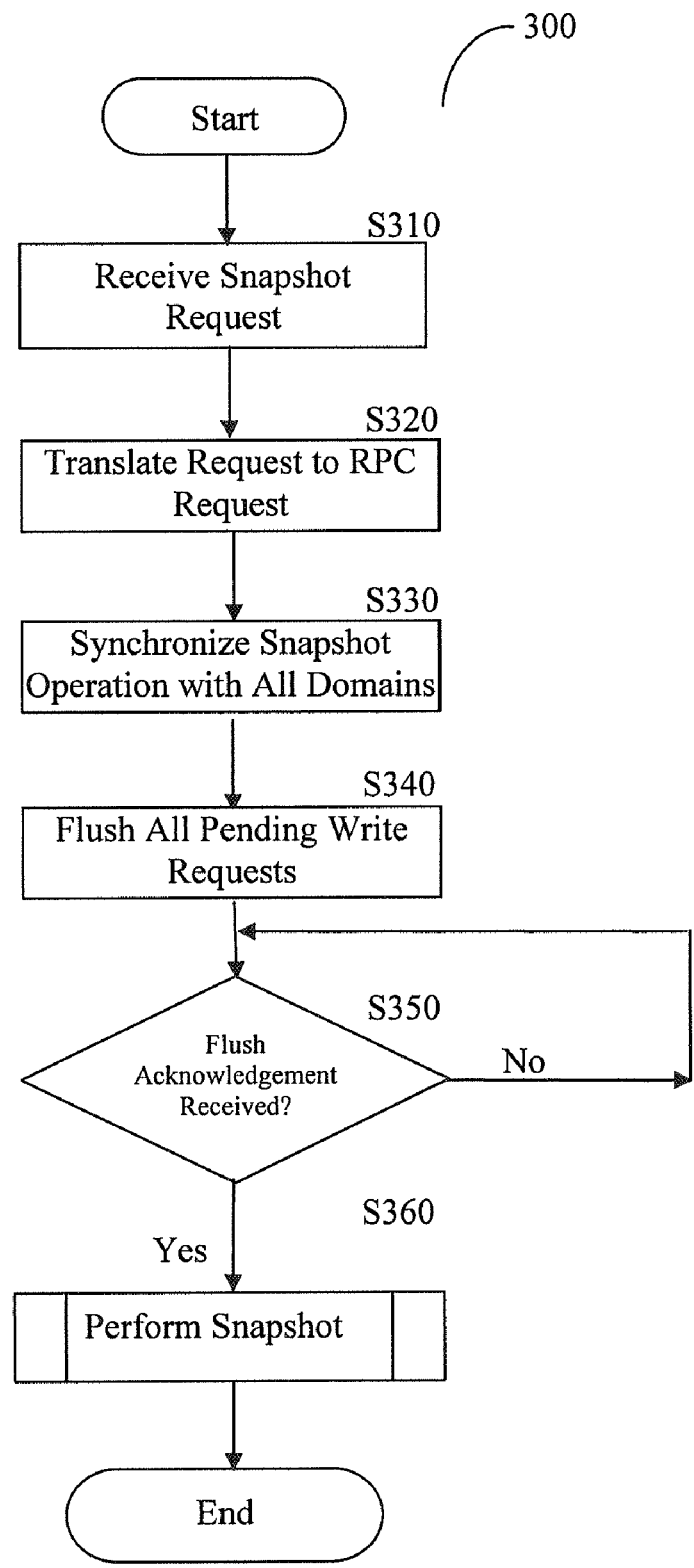
FIG. 3 is a flowchart of a method for performing a snapshot operation in accordance with an exemplary embodiment of the present invention.

FIG. 3 is a flowchart of a method 300 for performing a snapshot in the DSFS 200 in accordance with an exemplary embodiment of the present invention. Furthermore, while the method 300 is described in conjunction with the DSFS 200 and the system 100, one skilled in the art, upon reviewing the present application, clearly would understand that the method 300 is not limited to this specific implementation and can be implemented in many types of file systems.

Furthermore, the method 300 allows the DSFS 200 to create a snapshot without stopping the operation of the entire storage system 100. To accomplish this, the method 300 enables the system 100 to execute file system operations or requests while the snapshot is being created. Furthermore, the method 300 performs the snapshot operation in such a manner that preserves disk space.

In the method 300 shown in FIG. 3, one of front end services 210 receives a snapshot request (operation S310). In one implementation, one of the clients 140-1 to 140-N connected to the front end service 210 initiates the request, and the request may instruct the system 100 to perform a snapshot on one or more virtual volumes of a storage unit, a portion of a virtual volume, or an entire storage unit. A virtual volume is a virtual partition of physical disk space.

After receiving the snapshot request, the front end service 210 translates the snapshot request into an RPC request, which includes a time at which to perform the snapshot, and forwards the RPC request to the snapshot manager 260 (operation S320). Then, the snapshot manager 260 synchronizes the snapshot operation of all of the domains by sending the RPC request to all of the nodes 110 (operation S330). Alternative to the front end service 210 translating the snapshot request into the RPC request, the snapshot manager 260 may perform the translation prior to sending the RPC request to the nodes 110 (operations S320 and S330).

After all of the nodes 110 are synchronized, the store agent services 230 in the respective nodes 110 flush the data items of pending write requests by writing the pending write requests to their respective write cache memories 234 (operation S340). Then, the snapshot manager 260 determines whether each of the store service agents 230 acknowledges that its corresponding nodes 110 have flushed all of the pending write requests (operation S350). If acknowledgement all of the write requests have been flushed is received (operation S350: Yes), the snapshot manager 260 performs the snapshot (operation S360). In one example, the data items or write requests are written to the write cache memory 234, and thus, the time required to flush the data items or requests is on the order of milliseconds.

Figure 4:
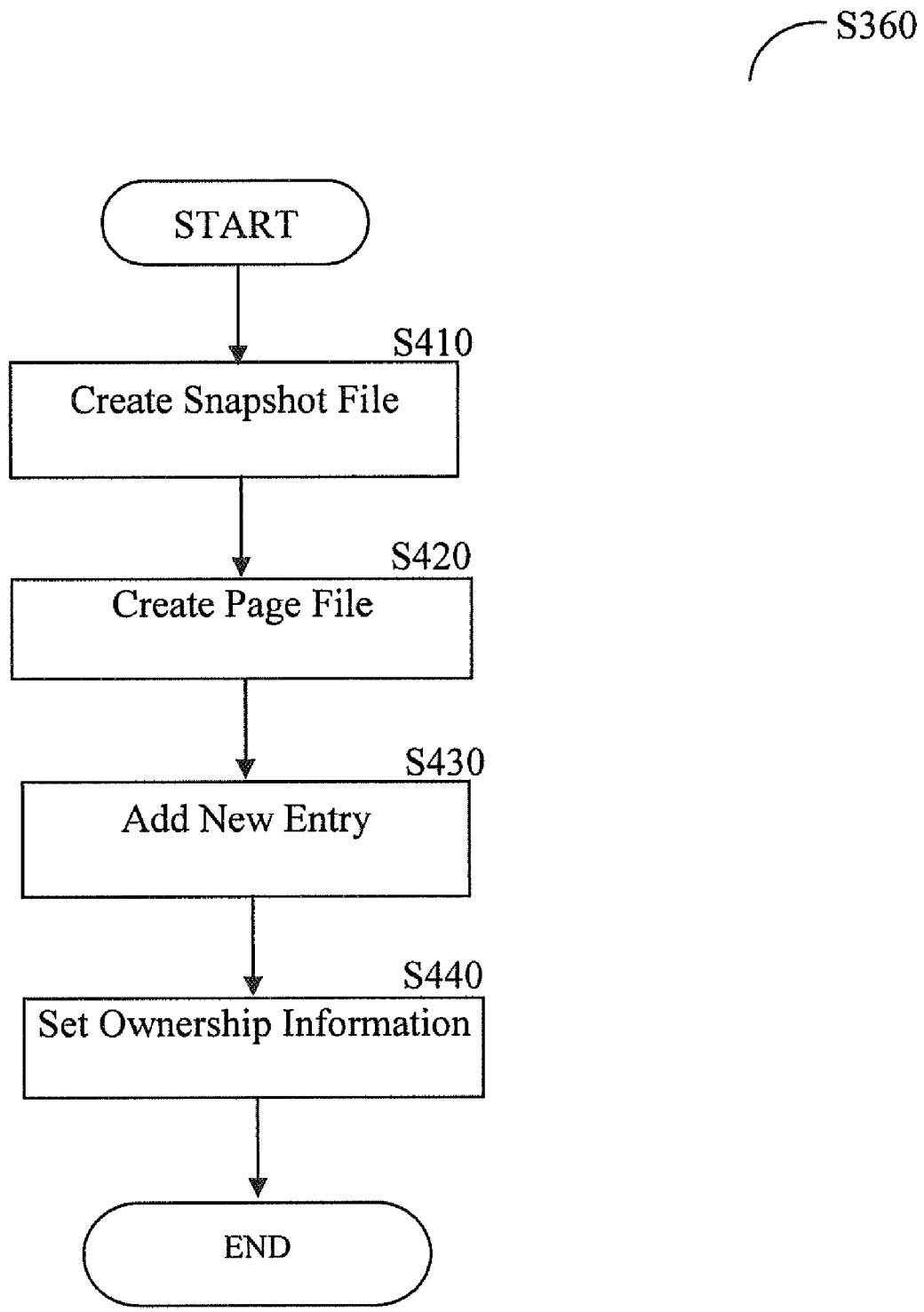
FIG. 4 is a flowchart of a method for creating a snapshot object in accordance with an exemplary embodiment of the present invention.

FIG. 4 shows a more detailed, non-limiting example of the snapshot operation S360. In the example, the snapshot is a read-only file that provides a complete point-in-time image of the DSFS 200. Moreover, in the exemplary embodiment, snapshots are created instantly and do not impact the DSFS 200 and its users because the users can submit file system requests to be executed by the DSFS 200 while the snapshot is being taken.

In accordance with the exemplary embodiment, the snapshot operation uses a "single-write" technique, which minimizes the disk space needed to maintain snapshot objects. For instance, the snapshot operation avoids duplicating data items that are the same in a snapshot object, as in an active file system, and original data items are appended to the latest snapshot object only when a data item is modified or removed. As such, mapping information of data items, which have not changed, is shared between the file system and snapshot objects, and modified or new data items are mapped separately.

Figure 5:
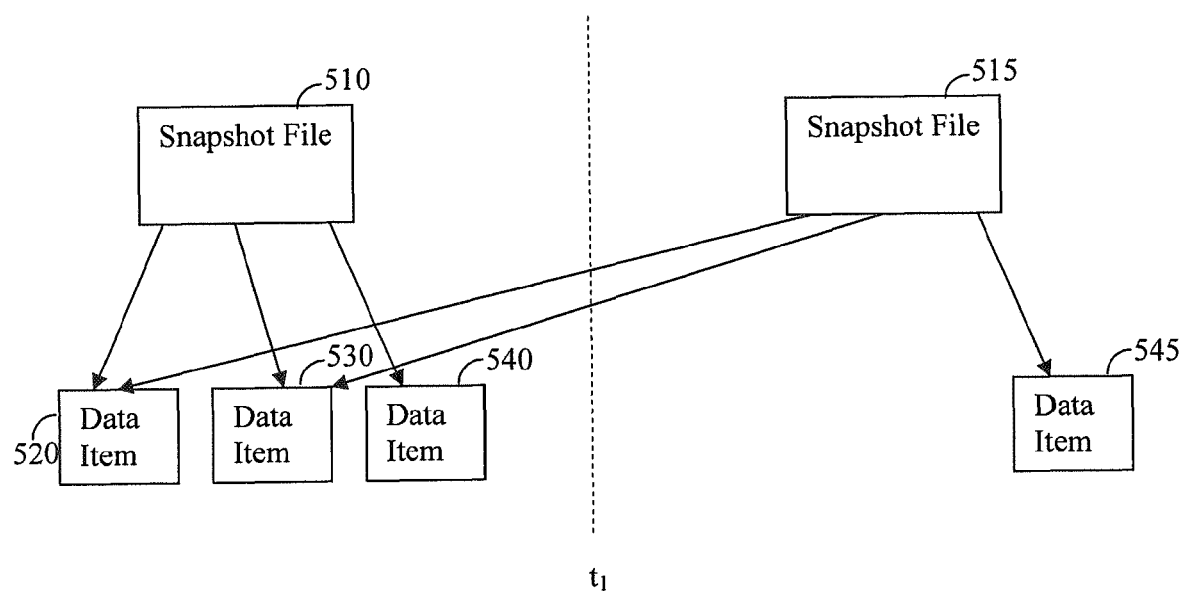
FIG. 5 is a diagram showing an exemplary mapping of snapshot objects to data items.

FIG. 5 further illustrates an example of this concept and shows a snapshot object 510 created prior to a time $t_1$ and a snapshot object 515 that was created at the time $t_1$. Thus, the snapshot object 515 represents a current image of the file system as of the time $t_1$, while the snapshot object 510 represents an image of the file system at some point before the time $t_1$.

The object 510 comprises mapping information (e.g., pointers) to data items 520, 530, and 540. After creating the snapshot object 510 and before the time $t_1$, one of the clients 140-1 to 140-N modifies the data item 540 to create a new data item 545. Then, at the time $t_1$, the new snapshot object 515 is created.

Since the data items 520 and 530 have not changed since the previous snapshot object 510 was created, the new snapshot object 515 points to the original data items 520 and 530. Accordingly, both snapshot objects 510 and 515 include mapping information to data items 520 and 530. On the other hand, since one of the clients 140-1 to 140-N changed the data 540 into the data item 545, the object 510 includes mapping information to the original data item 540 but not the new data item 545, and the object 515 includes mapping information to the new data item 545 but not the original data item 540.

As a further exemplary non-limiting implementation, page files are utilized to maintain the mapping information. For example, a single page file may correspond to each domain, and each page file may include a plurality of page entries. In addition, each of the page entries may include a pointer to a data item. Additionally, each page entry may contain ownership information that identifies whether or not a data item was overwritten when a corresponding snapshot was created. For instance, if the ownership information corresponding to a data item indicates that a particular data item is "owned," the snapshot object (which contains the ownership information) replaced the previous version of the particular data item with the particular data item. On the other hand, if the ownership information indicates that the particular data item is "not owned," the snapshot object (which contains the ownership information) did not replace the previous version of the particular data item. For example, referring to FIG. 5, the snapshot object 515 is the owner of the data item 545 and is "not owner" of the data items 520 or 530. The snapshot object 515 does not maintain any ownership information regarding data item 540, as the data item 540 was modified to item 545. On the other hand, the snapshot object 510 is the owner of the items 520, 530, and 540. The snapshot object does not maintain any ownership information regarding is not the owner of the item 545. Moreover, the mapper service 240 manages the ownership information.

Referring back to FIG. 4, an example of the details of the operation S360 (FIG. 3) for performing a snapshot is shown. For instance, the file system creates a new snapshot object and records the particular time at which the snapshot object was created (operation S410). As described above, the snapshot object represents the current status of the file system at the particular time. Then, if a data item was modified, added, or removed since the previous snapshot object was created, a new page file is created (operation S420). The new page file inherits mapping and ownership information of the previous snapshot object, and ownership information is marked as shared. A shared data item is a data item to which two or more snapshot objects (files) point. For example, items 520 and 530 are shared data items because two snapshot objects (files 510 and 515) point to them. Subsequently, a new entry is added to the new page file to include the mapping information to modified or new data items (operation S430), and the ownership information for the new entry is set to "owned." Moreover, operations S430 and S440 are repeated for each new or modified data item.

By using page files and mapping information, one skilled in the art, upon reviewing the present application, will realize that the non-limiting method and file system described above enables the system to maintain an unlimited number of snapshot objects. In contrast, other techniques maintain snapshot related information in a fixed-length data structure, and thus, the length of the data structure limits the number of snapshot objects.

In addition, the non-limiting embodiments described herein may be implemented in software, hardware, firmware, or any combination thereof.

The foregoing description of the exemplary embodiments of the invention has been presented for purposes of illustration and description. It is not intended to be exhaustive or to limit the invention to the precise form disclosed, and modifications and variations are possible in light of the above teachings or may be acquired from practice of the invention. The exemplary embodiments were chosen and described in order to explain some aspects of the invention and its practical application to enable one skilled in the art to utilize the invention in various exemplary embodiments and with various modifications as are suited to the particular use contemplated.

Thus, while only certain exemplary embodiments of the invention have been specifically described herein, it will be apparent that numerous modifications may be made thereto without departing from the spirit and scope of the invention.

What is claimed is:

1. A method for performing a snapshot in a distributed shared file system (DSFS), the method comprising:
   synchronizing a snapshot operation among a plurality of domains of the DSFS;
   writing pending write requests for each of the plurality of domains to a memory; and
   generating a snapshot file comprising data items representing a current state of the DSFS, wherein the data items include data from the pending write requests.

2. The method of claim 1 further comprising:
   after the generating the snapshot file, reading the pending write requests from the memory and resuming the write operations.

3. The method of claim 1, wherein the snapshot file comprises a current image of the DSFS.

4. The method of claim 1, wherein the DSFS further comprises a front end service which performs protocol conversion.

5. The method of claim 1, wherein the DSFS further comprises a mapper service which maps data items to their physical location in the system.

6. The method of claim 1 further comprising:
   receiving a request to perform a snapshot, wherein the synchronizing the snapshot operation is performed in response to the receiving the request.

7. The method of claim 6 further comprising:
   translating the snapshot request into a remote procedure call request which includes a time to perform the snapshot.

8. The method of claim 1, wherein the snapshot file comprises a page file.

9. The method of claim 8, wherein the page file is not maintained in a fixed-length data structure.

10. The method of claim 8, wherein the page file comprises mapping information of the data items in the DSFS.

11. The method of claim 10, wherein the page file further comprises ownership information for the data items in the DSFS, and wherein the ownership information comprises information relating to a type of the data items, permissions of the data items, or data other than content of the data items.

12. The method of claim 11, wherein the DSFS further comprises a metadata service which manages the ownership information.

13. The method of claim 11, wherein the ownership information and the mapping information of unchanged data items are shared between different snapshot files.

14. The method of claim 13, wherein a plurality of snapshot files is created at different times.

15. The method of claim 1, wherein the memory comprises a cache memory.

16. The method of claim 15, wherein:
   the DSFS further comprises a store agent service to provide data logging services and at least one disk store agent service to handle data that is located in a specific storage device;
   the store agent service comprises a relocator and the memory; and
   the relocator saves, removes, and allocates space to the data items in the memory.

17. The method of claim 15, wherein the DSFS further comprises a snapshot manager, which executes tasks related to creating and removing snapshot files, generating snapshot statistics, and synchronizing the snapshot operation among the plurality of domains of the DSFS.

18. The method of claim 17, wherein the snapshot manager receives acknowledgement that pending write requests have been written to the cache memory before the snapshot file is generated.

19. A computer program product including a computer-readable medium comprising software instructions for performing a snapshot in a distributed shared file system (DSFS), the instructions when executed configured to:
   synchronize a snapshot operation among a plurality of domains of the DSFS;
   write pending write requests for each of the plurality of domains to a memory; and
   generate a snapshot file comprising data items representing a current state of the DSFS, wherein the data items include data from the pending write requests.

20. The computer program product of claim 19, the instructions further configured to:
   after the generating the snapshot file, read pending write requests from the memory and resume the write operations.

21. The computer program product of claim 19, the instructions further configured to:
   receive a request to perform a snapshot, wherein the synchronizing the snapshot operation is performed in response to the received request.

22. The computer program product of claim 19, wherein the instructions further configured to:
   translate the snapshot request into a remote procedure call request which includes a time to perform the snapshot.

23. The computer program product of claim 19, wherein the snapshot file comprises a current image of the DSFS.

24. The computer program product of claim 19, wherein the snapshot file comprises a page file.

25. The computer program product of claim 24, wherein the page file is not maintained in a fixed-length data structure.

26. The computer program product of claim 24, wherein the page file comprises mapping information of the data items in the DSFS.

27. The computer program product of claim 26, wherein the page file further comprises ownership information for the data items in the DSFS, and wherein the ownership information comprises information relating to a type of the data items, permissions of the data items, or data other than content of the data items.

28. The computer program product of claim 27, wherein the ownership information and the mapping information of unchanged data items are shared between different snapshot files.

29. The computer program product of claim 28, wherein a plurality of snapshot files is created at different times.

30. A system configured for performing a snapshot in a distributed shared file system (DSFS), the system comprising:
   a storage device; and
   a node communicatively coupled to the storage device, the node including:
      a memory;
      a store agent service configured to write pending write requests for each of a plurality of domains of the DSFS to the memory; and
      a snapshot manager configured to:
         synchronize a snapshot operation among the plurality of domains of the DSFS; and
         generate a snapshot file comprising data items representing a current state of the DSFS, wherein the data items include data from the pending write requests.

31. The system of claim 30 wherein the node further comprises a front end service configured to perform protocol conversion.

32. The system of claim 30, wherein:
the snap shot file comprises a page file including ownership information for the data items in the DSFS; and
the node further comprises a metadata service configured to manage the ownership information.

33. The system of claim 30, wherein the node further comprises a mapper service configured to maps data item to their physical location in the system.

34. The system of claim 30, wherein the node further includes a first end service configured to:
receive a request to perform a snapshot, wherein the synchronizing the snapshot operation is performed in response to the received request.

35. The system of claim 30, wherein the snapshot manager is further configured to translate the snapshot request into a remote procedure call request which includes a time to perform the snapshot.

36. The system of claim 30, wherein the snapshot file comprises a current image of the DSFS.

37. The system of claim 30, wherein the memory comprises a cache memory.

38. The system of claim 37, wherein the store agent service is further configured to:
provide data logging services, wherein the store agent service comprises a relocator configured to save, remove, or allocate space to the data items in the cache memory; and
handle data that is located in the storage device.

39. The system of claim 37, wherein the snapshot manager is further configured to:
execute tasks related to creating and removing snapshot files; and
generate snapshot statistics.

40. The system of claim 39, wherein the snapshot manager is further configured to receive acknowledgement that the pending write requests have been written to the cache memory before the snapshot file is generated.

* * * * *